(12) United States Patent
Ohashi

(10) Patent No.: US 11,843,341 B2
(45) Date of Patent: Dec. 12, 2023

(54) IMAGE FORMING APPARATUS HAVING REDUCED POWER CONSUMPTION

(71) Applicant: CANON KABUSHIKI KAISHA, Tokyo (JP)

(72) Inventor: Yohei Ohashi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 127 days.

(21) Appl. No.: 17/533,935

(22) Filed: Nov. 23, 2021

(65) Prior Publication Data

US 2022/0173674 A1   Jun. 2, 2022

(30) Foreign Application Priority Data

Nov. 30, 2020   (JP) ................................ 2020-198746

(51) Int. Cl.
*H02P 5/74* (2006.01)
*H02P 6/06* (2006.01)
*G03G 15/00* (2006.01)

(52) U.S. Cl.
CPC .............. *H02P 5/74* (2013.01); *G03G 15/50* (2013.01); *H02P 6/06* (2013.01)

(58) Field of Classification Search
USPC ....................................................... 358/498
See application file for complete search history.

(56) References Cited

U.S. PATENT DOCUMENTS

| | | | |
|---|---|---|---|
| 2009/0136243 A1* | 5/2009 | Tanaka | G03G 15/55 318/473 |
| 2011/0062900 A1* | 3/2011 | Shin | H02P 6/04 318/400.38 |
| 2017/0288590 A1 | 10/2017 | Nito | |
| 2017/0346974 A1* | 11/2017 | Nito | G03G 15/6573 |
| 2019/0312538 A1* | 10/2019 | Suda | H02P 21/16 |

* cited by examiner

*Primary Examiner* — Jacky X Zheng
(74) *Attorney, Agent, or Firm* — Canon U.S.A., Inc. I.P. Division

(57) ABSTRACT

An image forming apparatus includes a photosensitive member, an intermediate transfer member, a moving member, a driving motor, a stepper motor, a detector, a phase determiner, and a controller. The stepper motor drives the moving member to move between a first position at which the photosensitive member contacts the intermediate transfer member and a second position at which the photosensitive member contacts the intermediate transfer member are separated. The controller includes a first control mode to control a motor based on a predetermined current magnitude and a second control mode to control a motor by vector control. The controller starts driving the driving motor in the first control mode, and then switches from the first control mode to the second control mode. The controller controls the stepper motor in the first control mode during a period from when the stepper motor is activated to when the stepper motor is stopped.

9 Claims, 10 Drawing Sheets

IMAGE FORMING APPARATUS HAVING REDUCED POWER CONSUMPTION

BACKGROUND

Field

The present disclosure relates to control of a motor in an image forming apparatus.

Description of the Related Art

A control method called vector control has heretofore been known as a method for controlling a motor. The vector control includes controlling the motor by controlling current values represented in a rotating coordinate system based on a rotation phase of a rotor of the motor. Specifically, in this known control method, the motor is controlled by performing phase feedback control to control the current values represented in the rotating coordinate system so that a deviation between an instruction phase and the rotation phase of the rotor decreases.

In the vector control, the driving currents flowing through windings of the motor are expressed by a q-axis component (torque current component) and a d-axis component (excitation current component). The q-axis component is a current component that generates torque for rotating the rotor. The d-axis component is a current component affecting the strength of magnetic fluxes through the windings of the motor. The torque for rotation is efficiently generated by controlling the value of the torque current component based on a change in load torque acting on the rotor. As a result, an increase in motor noise and an increase in power consumption due to surplus torque can be reduced. Such a control can also prevent the rotor from going out of synchronization with the input signals and the motor from entering an uncontrollable state (step-out state) because the load torque acting on the rotor exceeds the output torque corresponding to the driving currents supplied to the windings of the motor.

United States Patent Application Publication No. 2017/0288590 discusses a reduction of the power consumption of an image forming apparatus by controlling a stepper motor (hereinafter, may be referred to as a motor) for driving a load mounted in the image forming apparatus by using vector control.

United States Patent Application Publication No. 2017/0288590 discusses a configuration where constant current control is used to control the motor by supplying predetermined currents to the windings of the motor if an instruction speed of the rotor is less than a predetermined rotation speed. United States Patent Application Publication No. 2017/0288590 further discusses a configuration where the vector control is used if the instruction speed of the rotor is greater than or equal to the predetermined rotation speed. More specifically, in the configuration discussed in United States Patent Application Publication No. 2017/0288590, the motor controlled by the vector control is stopped after the motor control method is switched from the vector control to the constant current control.

FIG. 10 is a diagram illustrating an example of a relationship between an instruction speed $\omega\_ref$ indicating a target speed of the rotor of the motor and an actual rotation speed w of the rotor of the motor. The dot-dashed line in FIG. 10 represents the instruction speed $\omega\_ref$, and the solid line the rotation speed ω. In FIG. 10, the dot-dashed line and the solid line are illustrated overlapping in a period from when the motor starts to be driven to when the motor starts to be decelerated and in a period from when the instruction speed $\omega\_ref$ falls to or below a threshold $\omega th$ to when the motor stops being driven. The waveform of the instruction speed $\omega\_ref$ and the number of driving pulses output from a host device, such as a central processing unit (CPU), during the period from when the motor starts to be driven to when the motor is stopped are set in advance, for example, based on a driving sequence of the motor. In other words, the number of driving pulses output from the host device in a period from when the motor control is switched from the vector control to the constant current control to when the motor is stopped is set in advance.

As illustrated in FIG. 10, when the instruction speed $\omega\_ref$ decreases, the rotation speed w does not immediately follow the instruction speed $\omega\_ref$ but has a value greater than that of the instruction speed $\omega\_ref$. In other words, the rotation phase of the rotor leads the target phase of the rotor. The reason is that the rotor rotating at constant speed tends to keep rotating at the constant speed because of inertia.

For example, suppose that the instruction speed $\omega\_ref$ decreases during execution of the vector control. The motor control device controlling the motor performs control of the driving currents such that the rotation phase of the rotor agrees with the target phase, after the rotation phase is detected to be ahead of the target phase. As a result, the rotation phase can be ahead of the target phase by an electrical angle of 360° or more because of the control delay. If the motor control is switched from the vector control to the constant current control with the rotation phase ahead of the target phase by an electrical angle of 360° or more, the rotor can be stopped at a rotation phase ahead of the phase where the rotor is supposed to be stopped. In other words, the rotation phase where the rotor is supposed to be stopped and the actual stopped phase of the rotor can be different.

In an image forming apparatus, a cam for contacting and separating a photosensitive drum bearing a toner image and a transfer roller for transferring the toner image formed on the photosensitive drum to a transfer belt is driven by a motor. In the image forming apparatus, a cam for contacting and separating a fixing roller for fixing a toner image to a recording medium and a pressure roller for forming a nip portion with the fixing roller is also driven by a motor. If the control method discussed in United States Patent Application Publication No. 2017/0288590 is applied to control a motor that drives such a cam for adjusting a distance between a rotation shaft of a first rotating member and a rotation shaft of a second rotating member (contacting and separating the first and second rotating members), the following issue can occur. That is, the distance between the rotation shaft of the first rotating member and the rotation shaft of the second rotating member can fail to be precisely adjusted, since the motor is stopped after the motor control method is switched from the vector control to the constant current control. If the distance between the rotation shafts of the first and second rotating members is not precisely adjusted, an image can fail to be appropriately formed on a recording medium.

SUMMARY

The present disclosure is directed to reducing an increase in the power consumption of an image forming apparatus and preventing a failure of appropriate formation of an image on a recording medium.

According to an aspect of the present disclosure, an image forming apparatus includes a photosensitive member, an intermediate transfer member to which a toner image formed on the photosensitive member is to be transferred, a conveyance roller configured to convey a recording medium, a transfer unit configured to transfer the toner image transferred to the intermediate transfer member to the recording medium conveyed by the conveyance roller, a moving member configured to move between a first position where the photosensitive member is in contact with the intermediate transfer member and a second position where the photosensitive member is separated from the intermediate transfer member, a driving motor configured to drive the conveyance roller, a stepper motor configured to drive the moving member, a detector configured to detect a driving current flowing through a winding of the driving motor, a phase determiner configured to determine a rotation phase of a rotor of the driving motor based on the driving current detected by the detector, and a controller including a first control mode to control a motor based on a current having a predetermined magnitude and a second control mode to control a motor by vector control based on the rotation phase determined by the phase determiner, wherein the controller is configured to start driving the driving motor in the first control mode, and switch a control mode in which the driving motor is controlled from the first control mode to the second control mode in a case where a value corresponding to a rotation speed of the rotor of the driving motor exceeds a predetermined value during execution of the first control mode, and wherein the controller is configured to control the stepper motor in the first control mode during a period from when the stepper motor is activated to when the stepper motor is stopped.

Further features of the present disclosure will become apparent from the following description of exemplary embodiments with reference to the attached drawings.

DESCRIPTION OF THE EMBODIMENTS

Exemplary embodiments of the present disclosure will be described below with reference to the drawings. Shapes and relative arrangement of components described in the exemplary embodiments are subject to appropriate modifications depending on the configurations of apparatuses to which the exemplary embodiments are applied, as well as various conditions. The following exemplary embodiments are not intended to limit the scope of the present disclosure.

[Image Forming Apparatus]

Figure 1:
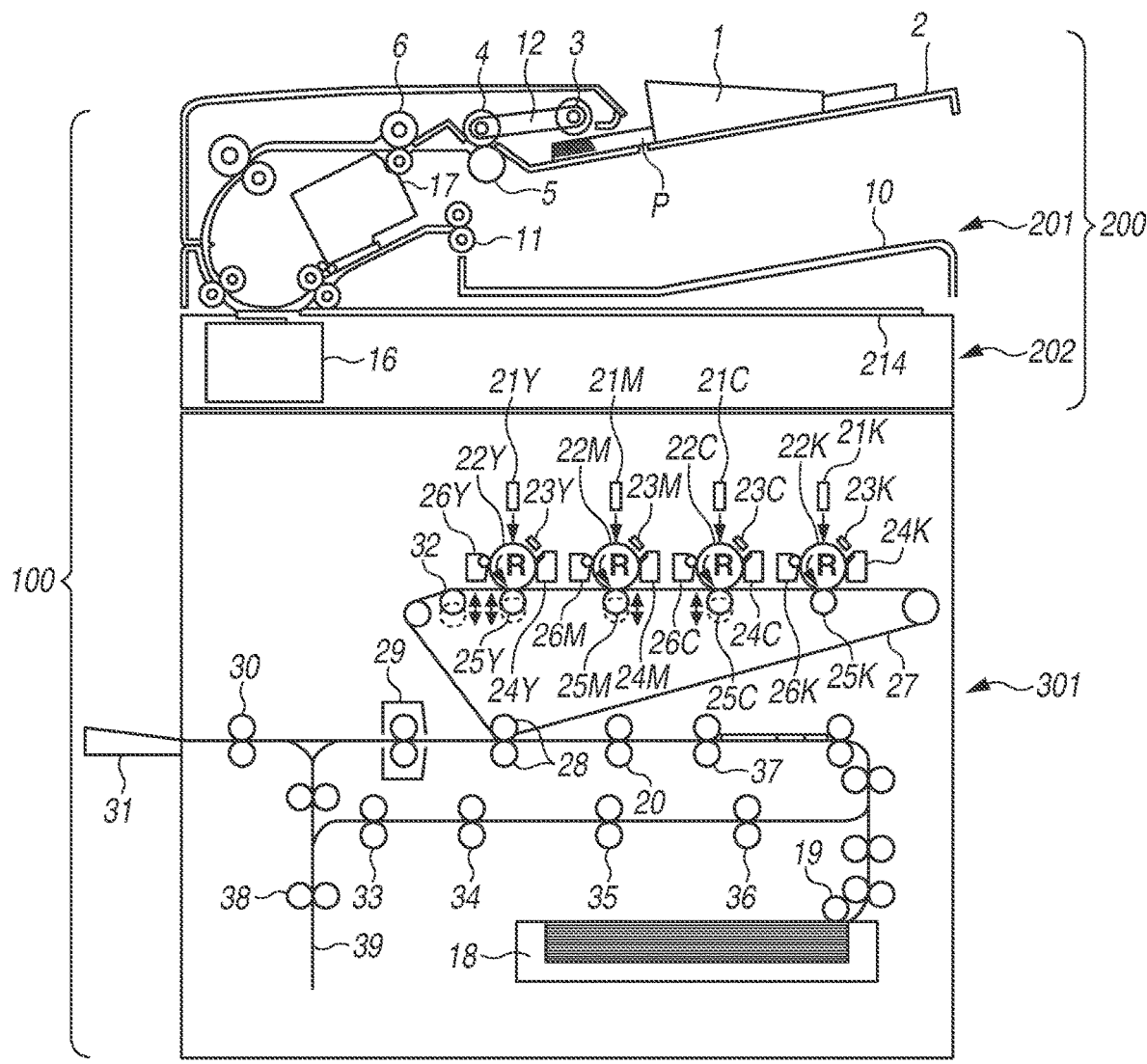
FIG. 1 is a sectional view for describing an image forming apparatus.

FIG. 1 is a sectional view illustrating a configuration of a color electrophotographic copying machine (hereinafter, referred to as an image forming apparatus) 100 used in a first exemplary embodiment. The image forming apparatus 100 is not limited to a copying machine, and may be, for example, a facsimile apparatus, a printing machine, or a printer. The recording method is not limited to the electrophotographic method, and may be, for example, an inkjet method. Moreover, the image forming apparatus 100 may be either a monochrome or color image forming apparatus.

The configuration and functions of the image forming apparatus 100 will be described below with reference to FIG. 1. As illustrated in FIG. 1, the image forming apparatus 100 includes a document reading apparatus 200 including a document feeding apparatus 201 and a reading apparatus 202, and an image printing apparatus 301.

<Document Reading Apparatus>

Documents P stacked on a document stacking portion 2 of the document feeding apparatus 201 are fed by a pickup roller 3 one by one. The fed document P is then conveyed further downstream by a feed roller 4. A separation roller 5 pressed against the feed roller 4 is located opposite the feed roller 4. The separation roller 5 is configured to rotate if load torque greater than or equal to a predetermined torque acts on the separation roller 5. The separation roller 5 has a function of separating two sheets fed in a stacked state.

The pickup roller 3 and the feed roller 4 are coupled by a swing arm 12. The swing arm 12 is supported by a rotation shaft of the feed roller 4 to be rotatable about the rotation shaft of the feed roller 4.

The document P is conveyed by the feed roller 4 and other rollers, and discharged to a discharge tray 10 by a discharge roller 11.

The reading apparatus 202 includes a document reading unit 16 that reads an image on a first side of the conveyed document P. Image information read by the document reading unit 16 is output to the image printing apparatus 301.

The document feeding apparatus 201 also includes a document reading unit 17 that reads an image on a second side of the conveyed document P. Image information read by the document reading unit 17 is output to the image printing apparatus 301 similarly to the case of the document reading unit 16.

The document P is thus read in the foregoing manner.

Possible document reading modes include a first reading mode and a second reading mode. The first reading mode is a mode where the images on the conveyed document P are read by the method described above. The second reading mode is a mode where an image on a document P placed on a document glass plate 214 of the reading apparatus 202 is read by the document reading unit 16 moving at constant speed. Images on sheet-like documents are typically read in the first reading mode. An image on a bound document, such as a book and a leaflet, is read in the second reading mode.

<Image Printing Apparatus>

The image printing apparatus 301 includes a sheet storage tray 18 for storing recording media inside. The recording media refer to ones for the image forming apparatus 100 to form an image on. Examples of the recording media include a sheet of paper, a resin sheet, cloth, an overhead projector (OHP) sheet, and a label.

The recording media stored in the sheet storage tray 18 are fed by a pickup roller 19 one by one. The fed recording medium is fed to a registration roller 20 by conveyance rollers.

The leading edge of the recording medium conveyed by a preregistration roller 37 is abutted against the registration roller 20. A loop formed between the registration roller 20 and the preregistration roller 37 corrects (reduces) a skew of the recording medium, accordingly.

The document reading apparatus 200 outputs image signals for respective color components, which are input to optical scanning units 21Y, 21M, 21C, and 21K each including a semiconductor laser and a polygonal mirror. Specifically, a yellow-related image signal output from the document reading apparatus 200 is input to the optical scanning unit 21Y. A magenta-related image signal output from the document reading apparatus 200 is input to the optical scanning unit 21M. A cyan-related image signal output from the document reading apparatus 200 is input to the optical scanning unit 21C. A black-related image signal output from the document reading apparatus 200 is input to the optical scanning unit 21K. In the following description, a configuration for forming a yellow image will be described. A similar configuration applies to magenta, cyan, and black.

An outer periphery of a photosensitive drum 22Y serving as a photosensitive member is charged by a charging device 23Y. After the outer periphery of the photosensitive drum 22Y is charged, the outer periphery of the photosensitive drum 22Y is irradiated with laser light from the optical scanning unit 21Y via an optical system including the polygonal mirror and other mirrors. The laser light is based on the image signal input to the optical scanning unit 21Y from the document reading apparatus 200. As a result, an electrostatic latent image is formed on the outer periphery of the photosensitive drum 22Y.

The electrostatic latent image is developed with toner by a developing device 24Y serving as a developing unit. A toner image is thereby formed on the outer periphery of the photosensitive drum 22Y. The toner image formed on the photosensitive drum 22Y is transferred to a transfer belt 27 serving as an intermediate transfer member by a transfer roller 25Y located opposite the photosensitive drum 22Y. After the transfer of the toner image to the transfer belt 27, toner remaining on the outer periphery of the photosensitive drum 22Y is collected by a cleaning unit 26Y.

Yellow, magenta, cyan, and black toner images transferred to the transfer belt 27 serving as a transfer unit are transferred to a recording medium by a transfer roller pair 28. A high voltage is applied to the transfer roller pair 28, and the toner images are transferred to the recording medium due to the high voltage. The registration roller 20 feeds the recording medium to the transfer roller pair 28 in synchronization with the transfer timing. When the registration roller 20 feeds the skew-corrected recording medium to the transfer roller pair 28, the preregistration roller 37 and the roller forming the nip portion with the preregistration roller 37 may be separated. The separation of the preregistration roller 37 and the roller forming the nip portion with the preregistration roller 37 can prevent the occurrence of wrinkles in the recording medium being conveyed by the registration roller 20.

The recording medium to which the toner images are transferred as described above is fed into a fixing device 29 serving as a fixing unit. The recording medium is heated and pressed by the fixing device 29, whereby the toner images are fixed to the recording medium. In such a manner, the image forming apparatus 100 forms an image on the recording medium.

Figure 2A:
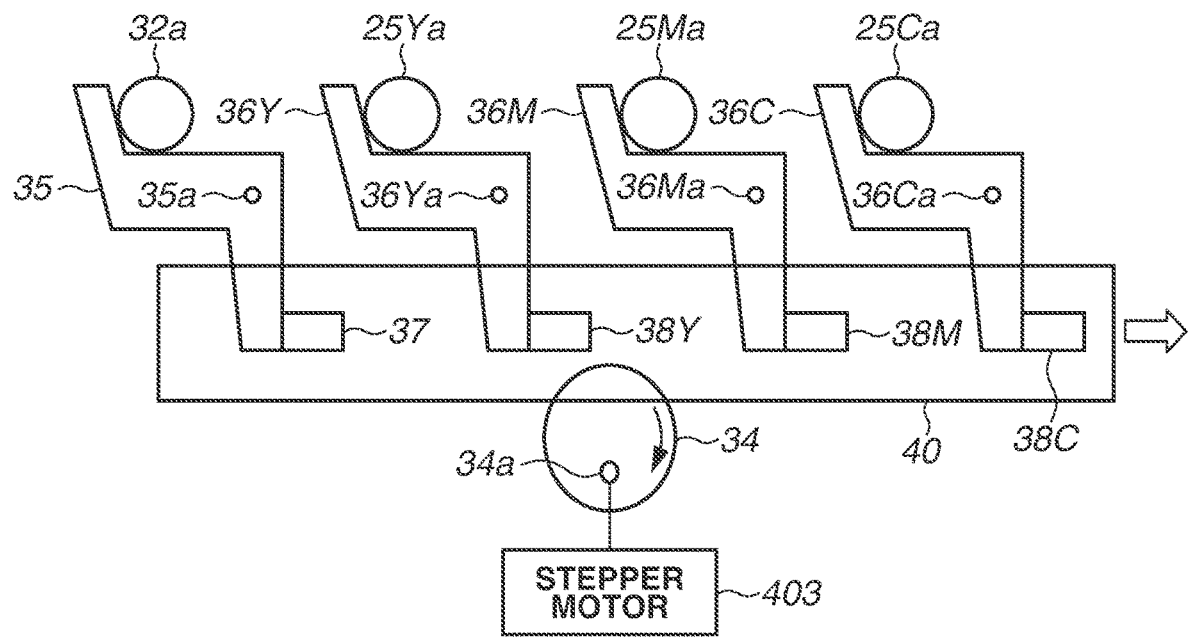
FIGS. 2A and 2B are diagrams for describing a configuration for contacting and separating transfer rollers and photosensitive drums corresponding to the transfer rollers.
Figure 2B:
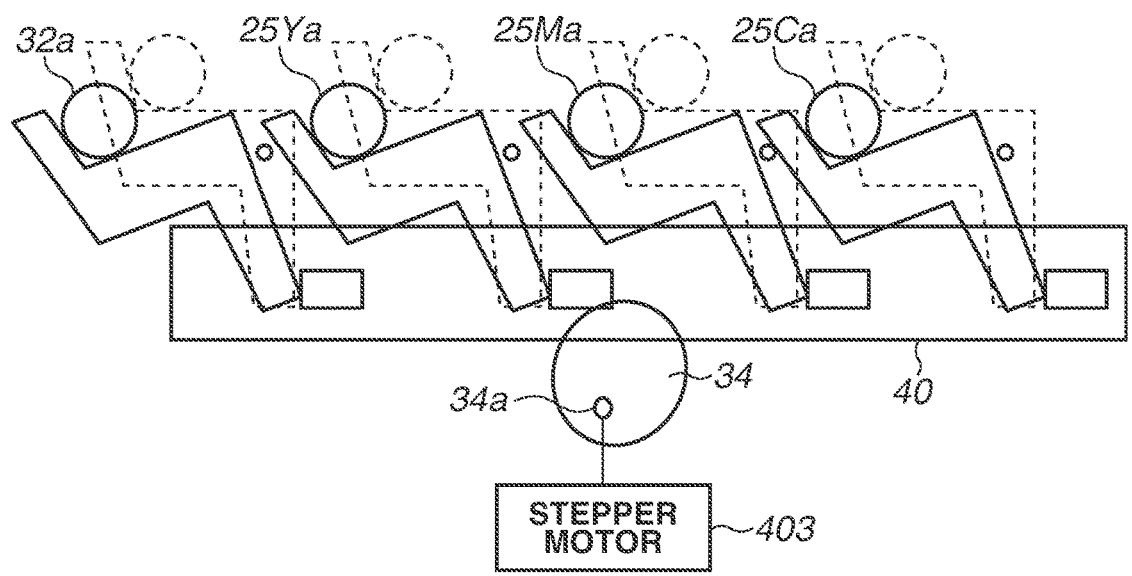

In forming a monochrome image on a recording medium, the transfer rollers 25Y, 25M, and 25C are separated from the photosensitive drums 22Y, 22M, and 22C, respectively. FIGS. 2A and 2B are diagrams for describing a configuration for contacting and separating the transfer rollers 25Y, 25M, and 25C and the photosensitive drums 22Y, 22M, and 22C corresponding to the transfer rollers 25Y, 25M, and 25C.

As illustrated in FIG. 2A, a rotation shaft 32a of a stretching roller 32 for stretching the transfer belt 27 is held by a holding unit 35. The holding unit 35 is rotatable with a rotation shaft 35a as its rotation axis, and is supported by a stopper 37 to not rotate counterclockwise in FIG. 2A.

A rotation shaft 25Ya of the transfer roller 25Y is held by a holding unit 36Y. The holding unit 36Y is rotatable with a rotation shaft 36Ya as its rotation axis, and is supported by a stopper 38Y to not rotate counterclockwise in FIG. 2A. A rotation shaft 25Ma of the transfer roller 25M is held by a holding unit 36M. The holding unit 36M is rotatable with a rotation shaft 36Ma as its rotation axis, and is supported by a stopper 38M to not rotate counterclockwise in FIG. 2A. A rotation shaft 25Ca of the transfer roller 25C is held by a holding unit 36C. The holding unit 36C is rotatable with a rotation shaft 36Ca as its rotation axis, and is supported by a stopper 38C to not rotate counterclockwise in FIG. 2A.

The stoppers 37, 38Y, 38M, and 38C are disposed on an arm unit 40. The arm unit 40 moves to the right as a cam 34 rotates clockwise in FIG. 2A. The cam 34 is driven by a stepper motor 403 described below and rotates with a rotation shaft 34a as its rotation axis. If the arm unit 40 is moved to the right in FIG. 2A by a predetermined amount of rotation of the cam 34, the holding units 35, 36Y, 36M, and 36C rotate and the rotation shafts 32a, 25Ya, 25Ma, and 25Ca of the rollers 32, 25Y, 25M, and 25C move down in the diagram. As a result, the photosensitive drums 22Y, 22M, and 22C and the transfer rollers 25Y, 25M, and 25C are separated.

If the cam 34 in the state of FIG. 2B rotates counterclockwise by a predetermined amount, the arm unit 40 moves to the left and returns to the state of FIG. 2A. In other words, the cam 34 and the arm unit 40 serving as a moving member move between a first position illustrated in FIG. 2A and a second position illustrated in FIG. 2B.

As described above, in the present exemplary embodiment, a monochrome image is formed on the recording medium with the transfer rollers 25Y, 25M, and 25C (and the transfer belt 27) separated from the photosensitive drums 22Y, 22M, and 22C. This can reduce deterioration of the surfaces of the photosensitive drums 22Y, 22M, and 22C.

In forming an image in a one-sided printing mode, the recording medium passed through the fixing device 29 is discharged to a discharge tray 31 by a discharge roller 30. In forming images in a two-sided printing mode, the fixing processing is performed on the first side of the recording medium by the fixing device 29, and thereafter the recording medium is conveyed to a reversing path 39 by a reversing roller 38. The first and second sides of the recording medium conveyed to the reversing path 39 are reversed by the reversing roller 38, and the recording medium is conveyed to a conveyance guide where conveyance rollers 33, 34, 35, and 36 are disposed. The recording medium is conveyed to the registration roller 20 again by the conveyance rollers 33, 34, 35, and 36, and an image is formed on the second side of the recording medium by the method described above.

The recording medium is then discharged to the discharge tray 31 by the discharge roller 30.

The above is the description of the configuration and functions of the image forming apparatus 100.

<Control Configuration of Image Forming Apparatus>

Figure 3:
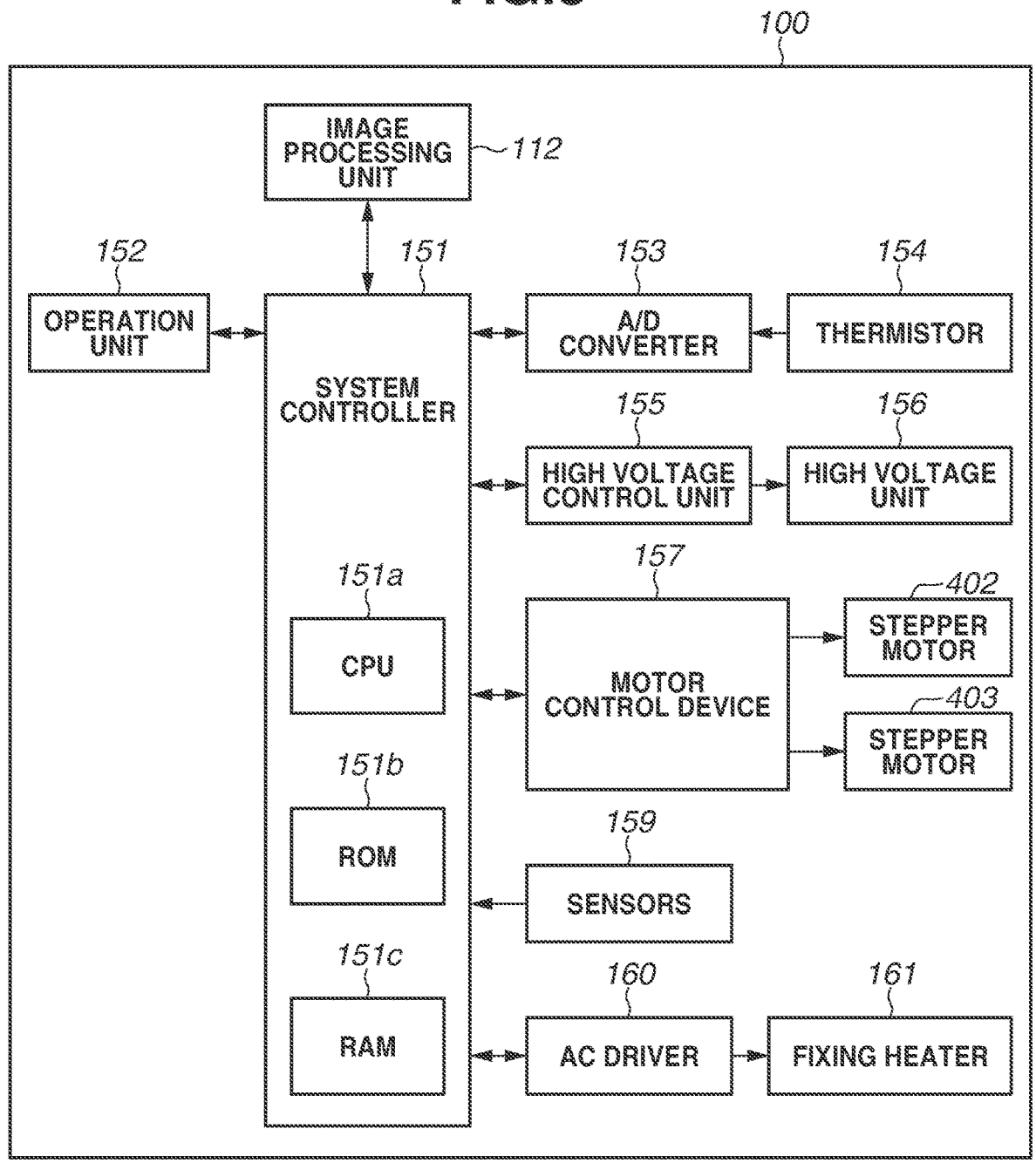
FIG. 3 is a block diagram illustrating a control configuration of the image forming apparatus.

FIG. 3 is a block diagram illustrating an example of a control configuration of the image forming apparatus 100. As illustrated in FIG. 3, a system controller 151 includes a central processing unit (CPU) 151a, a read-only memory (ROM) 151b, and a random access memory (RAM) 151c. The system controller 151 is connected to an image processing unit 112, an operation unit 152, an analog-to-digital (A/D) converter 153, a high voltage control unit 155, a motor control device 157, sensors 159, and an alternating-current (AC) driver 160. The system controller 151 can transmit and receive data and commands to/from the connected units.

The CPU 151a reads and executes various programs stored in the ROM 151b, and thereby performs various sequences related to a predetermined image formation sequence.

The RAM 151c is a storage device. The RAM 151c stores various types of data, such as setting values for the high voltage control unit 155, instruction values for the motor control device 157, and information received from the operation unit 152.

The system controller 151 transmits setting value data on various devices included in the image forming apparatus 100 to the image processing unit 112. The setting value data is used for image processing by the image processing unit 112. The system controller 151 further receives signals from the sensors 159, and sets the setting values of the high voltage control unit 155 based on the received signals.

The high voltage control unit 155 supplies predetermined voltages to a high voltage unit 156 (including the charging devices 23Y, 23M, 23C, and 23K, the developing devices 24Y, 24M, 24C, and 24K, and the transfer roller pair 28) based on the setting values set by the system controller 151.

The motor control device 157 serving as a control unit controls a stepper motor 402 serving as a driving motor that drives the conveyance rollers for conveying the recording medium based on commands output from the CPU 151a. The motor control device 157 also controls the stepper motor 403 that drives a cam mechanism described below based on commands output from the CPU 151a. In other words, the motor control device 157 according to the present exemplary embodiment can control a plurality of motors. While FIG. 3 illustrates only one motor control device, the image forming apparatus 100 actually includes two or more motor control devices. While FIG. 3 illustrates only two motors, the image forming apparatus 100 may include three or more motors.

The A/D converter 153 receives a detection signal detected by a thermistor 154 for detecting the temperature of a fixing heater 161, converts the detection signal that is an analog signal into a digital signal, and transmits the digital signal to the system controller 151. The system controller 151 controls the AC driver 160 based on the digital signal received from the A/D converter 153. The AC driver 160 controls the fixing heater 161 such that the temperature of the fixing heater 161 comes to a temperature desirable for the fixing processing. The fixing heater 161 is a heater used for the fixing processing, and is included in the fixing device 29.

The system controller 151 controls the operation unit 152 to display an operation screen for the user to make settings, such as the type of recording medium to be used, on a display unit included in the operation unit 152. The system controller 151 receives information set by the user from the operation unit 152, and controls an operation sequence of the image forming apparatus 100 based on the information set by the user. The system controller 151 also transmits information indicating the state of the image forming apparatus 100 to the operation unit 152. Examples of the information indicating the state of the image forming apparatus 100 include information about the number of images formed, the progress of an image forming operation, and sheet jams and double feeds in the document reading apparatus 200 and the image printing apparatus 301. The operation unit 152 displays the information received from the system controller 151 on the display unit.

In such a manner, the system controller 151 controls the operation sequence of the image forming apparatus 100.

[Motor Control Device]

The motor control device 157 will now be described. The motor control device 157 according to the present exemplary embodiment can control a motor to be controlled by using both control methods including constant current control that is a first control mode and vector control that is a second control mode. In the following description, the motor control device 157 performs the controls based on electrical angles such as a rotation phase θ, an instruction phase θ_ref, and a current phase. However, the electrical angles may be converted into mechanical angles, and the controls may be performed based on the mechanical angles.

{Vector Control}

A method where the motor control device 157 according to the present exemplary embodiment controls the stepper motor 402 by the vector control will be described with reference to FIGS. 4 and 5. The stepper motor 402 described below does not include a sensor, such as a rotary encoder for detecting the rotation phase of the motor rotor. However, the stepper motor 402 may be configured to include a sensor such as a rotary encoder.

Figure 4:
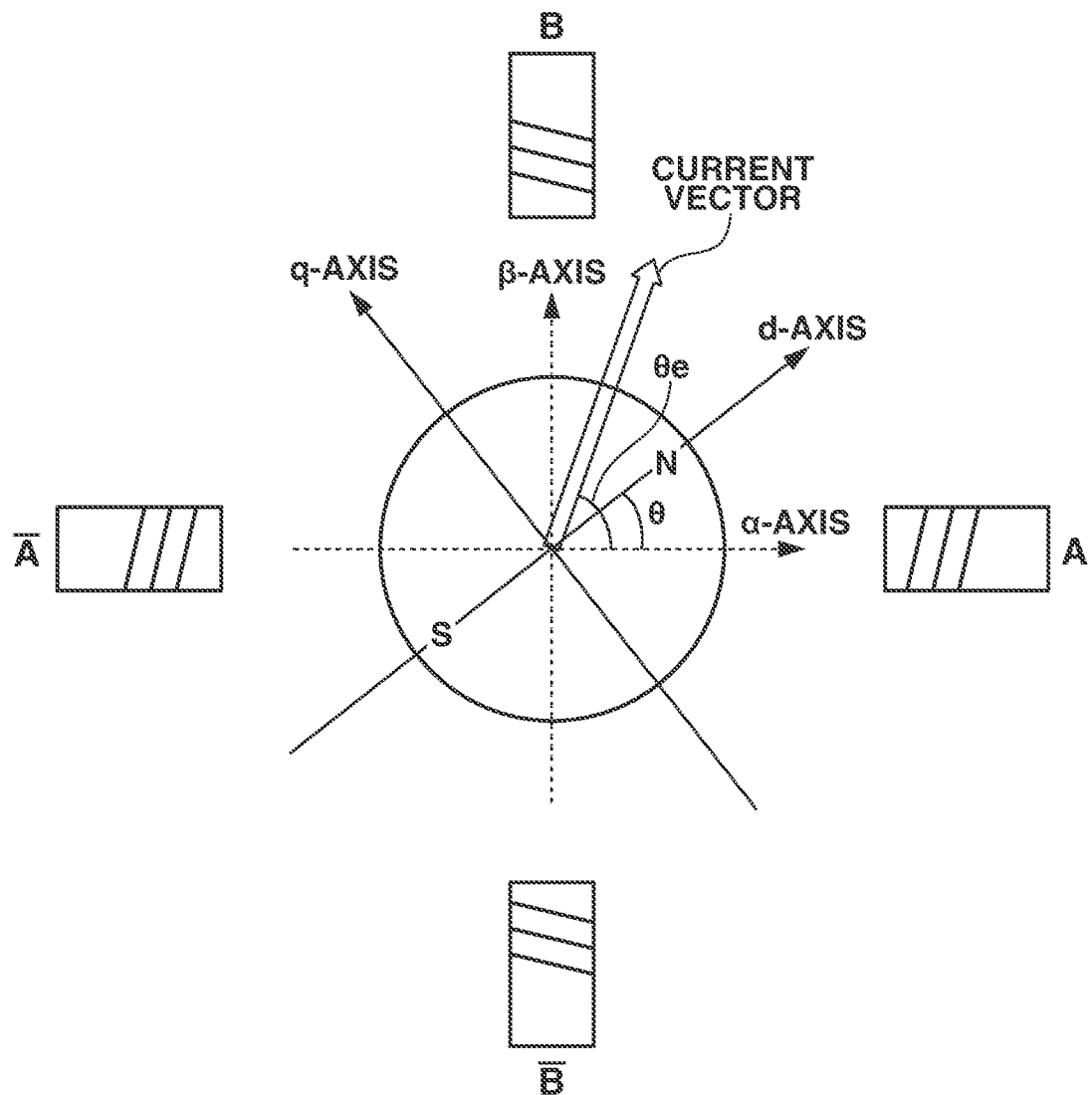
FIG. 4 is a diagram illustrating a relationship between a two-phase motor having phases A and B and a rotating coordinate system represented by d- and q-axes.

FIG. 4 is a diagram illustrating a relationship between the stepper motor 402 having two phases, phase A (first phase) and phase B (second phase), and a rotating coordinate system represented by a d-axis and a q-axis. FIG. 4 defines, in a stationary coordinate system, an a-axis, which is an axis corresponding to the winding of phase A, and a β-axis, which is an axis corresponding to the winding of phase B. In FIG. 4, the d-axis is defined along the direction of a magnetic flux generated by the poles of a permanent magnet used in the rotor. The q-axis is defined along the direction 90° ahead of the d-axis counterclockwise (direction orthogonal to the d-axis). The angle formed between the a-axis and the d-axis is defined as θ, and the rotation phase of the rotor is expressed by the angle θ. The vector control uses the rotating coordinate system based on the rotation phase θ of the rotor. Specifically, the vector control uses a q-axis component (torque current component) and a d-axis component (excitation current component). The q-axis component is a current component of a current vector corresponding to the driving current flowing through the windings in the rotating coordinate system and generates torque on the rotor. The d-axis component affects the strength of the magnetic fluxes through the windings.

The vector control refers to a control method for controlling a motor by performing phase feedback control, where the value of the torque current component and the value of the excitation current component are controlled such that a deviation between an instruction phase indicating a target phase of the rotor and the actual rotation phase decreases. The vector control may refer to a method for controlling the motor by performing speed feedback control, where the value of the torque current component and the value of the excitation current component are controlled such that a deviation between an instruction speed indicating a target speed of the rotor and the actual rotation speed decreases.

Figure 5:
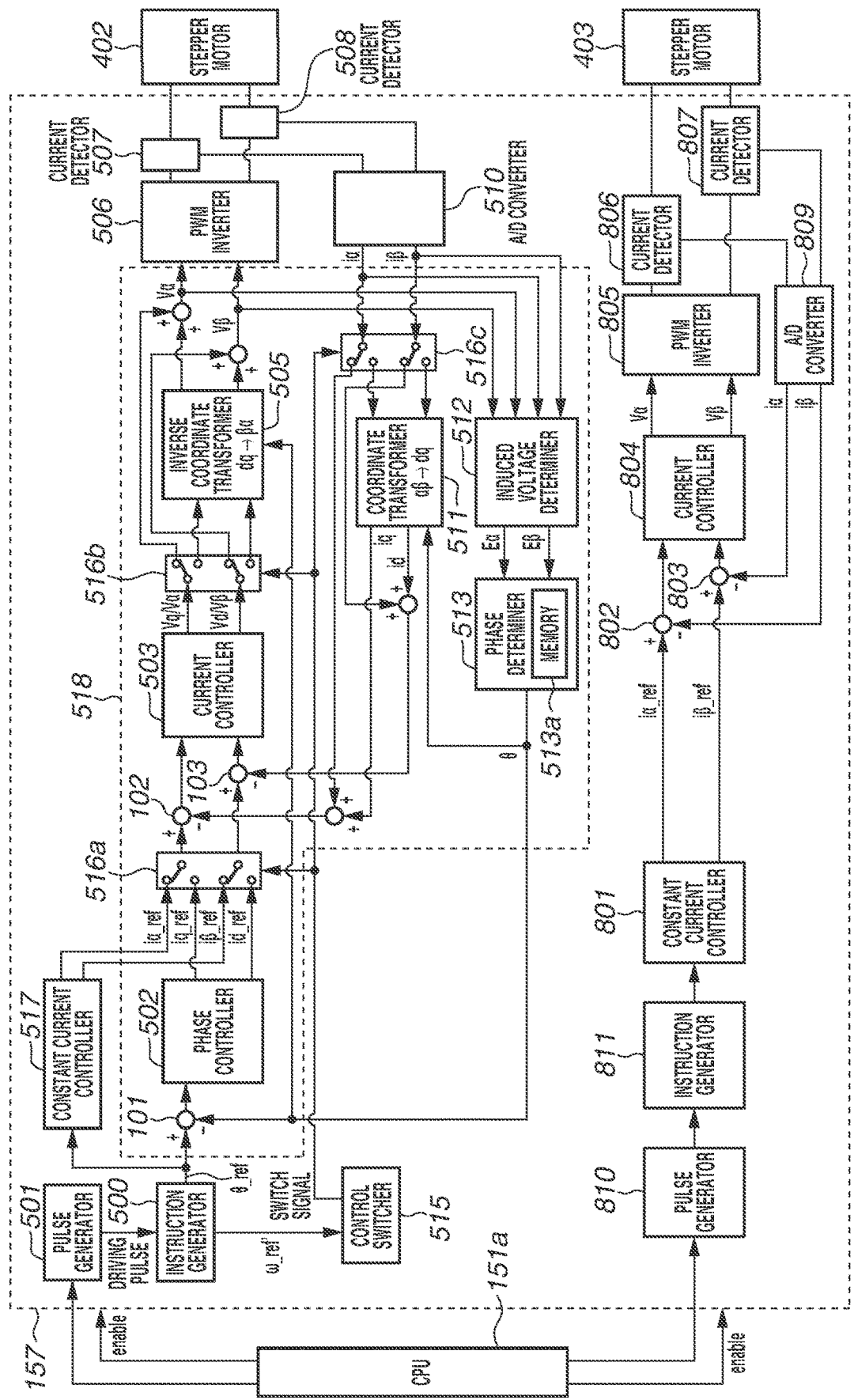
FIG. 5 is a block diagram illustrating a configuration of a motor control device.

FIG. 5 is a block diagram illustrating an example of a configuration of the motor control device 157 that controls the stepper motor 402. The motor control device 157 includes at least one application specific integrated circuit (ASIC), and performs functions described below.

The motor control device 157 includes a phase controller 502, a current controller 503, an inverse coordinate transformer 505, a coordinate transformer 511, and a pulse width modulation (PWM) inverter 506 as one or more circuits for performing the vector control. The PWM inverter 506 supplies driving currents to the windings of the stepper motor 402. The coordinate transformer 511 transforms the coordinates of the current vector corresponding to the driving currents flowing through the windings of phases A and B of the stepper motor 402 from the stationary coordinate system represented by the a- and β-axes into the rotating coordinate system represented by the q- and d-axes. As a result, the driving currents flowing through the windings are expressed by a q-axis component current value (q-axis current) and a d-axis component current value (d-axis current) that are current values in the rotating coordinate system. The q-axis current corresponds to the torque current that generates torque on the rotor of the stepper motor 402. The d-axis current corresponds to the excitation current that affects the strength of the magnetic fluxes through the windings of the stepper motor 402. The motor control device 157 can control the q-axis current and the d-axis current independently. As a result, the motor control device 157 can efficiently generate torque for rotating the rotor by controlling the q-axis current based on load torque acting on the rotor. In other words, the magnitude of the current vector illustrated in FIG. 4 varies with the load torque acting on the rotor, in the vector control.

The motor control device 157 determines the rotation phase θ of the rotor of the stepper motor 402 by using a method described below, and performs the vector control based on the determination result.

If the CPU 151a outputs an instruction to start driving the stepper motor 402 to the motor control device 157, a pulse generator 501 outputs driving pulses to an instruction generator 500 as a motor-driving command based on an operation sequence of the stepper motor 402. The operation sequence of the motor 402 (driving pattern of the motor 402) is stored in a memory included in the pulse generator 501, for example. The pulse generator 501 outputs the driving pulses as a pulse train based on the operation sequence.

The instruction generator 500 generates the instruction phase θ_ref indicating a target phase of the rotor based on the driving pluses output from the pulse generator 501, and outputs the instruction phase θ_ref. A configuration of the instruction generator 500 will be described below.

A subtractor 101 calculates a deviation Δθ between the rotation phase θ of the rotor of the stepper motor 402 and the instruction phase θ_ref, and outputs the deviation Δθ.

The phase controller 502 obtains the deviation Δθ at a period T (for example, 200 μs). The phase controller 502 generates a q-axis current instruction value iq_ref and a d-axis current instruction value id_ref based on proportional (P) control, integral (I) control, and differential (D) control so that the deviation Δθ output from the subtractor 101 decreases, and outputs the q-axis current instruction value iq_ref and d-axis current instruction value id_ref. Specifically, the phase controller 502 generates and outputs the q- and d-axis current instruction values iq_ref and id_ref based on P control, I control, and D control (hereinafter, may be referred to as PID control) so that the deviation Δθ output from the subtractor 101 becomes zero, and outputs the q- and d-axis current instruction values iq_ref and id_ref. Here, P control refers to a control method for controlling the value to be controlled based on a value proportional to the deviation between an instruction value and an estimated value. I control refers to a control method for controlling the value to be controlled based on a value proportional to the time integral of the deviation between the instruction value and the estimated value. D control refers to a control method for controlling the value to be controlled based on a value proportional to the temporal change of the deviation between the instruction value and the estimated value. While the phase controller 502 according to the present exemplary embodiment generates the q- and d-axis current instruction values iq_ref and id_ref based on PID control, this is not restrictive. For example, the phase controller 502 may generate the q- and d-axis current instruction values iq_ref and id_ref based on PI control. If a permanent magnet is used for the rotor, the d-axis current instruction value id_ref affecting the strength of the magnetic fluxes through the windings is typically set to 0. However, this is not restrictive.

The driving current flowing through the winding of phase A of the stepper motor 402 is detected by a current detector 507, and then converted from an analog value into a digital value by an A/D converter 510. The driving current flowing through the winding of phase B of the stepper motor 402 is detected by a current detector 508, and then converted from an analog value into a digital value by the A/D converter 510. The period (predetermined period) at which the current detectors 507 and 508 detect the driving currents is, for example, a period less than or equal to the period T (e.g., 25 μs) at which the phase controller 502 obtains the deviation Δθ.

The current values of the driving currents converted from analog to digital by the A/D converter 510 are expressed as current values iα and iβ in the stationary coordinate system by the following formulae (1) and (2):

$$i\alpha = I * \cos\theta e, \quad (1)$$

and $$i\beta = I * \sin\theta e, \quad (2)$$

where I is the magnitude of the current vector illustrated in FIG. 4, and θe is the phase of the current vector. The phase θe of the current vector is defined as an angle formed between the a-axis and the current vector.

The current values iα and iβ are input to the coordinate transformer 511 and an induced voltage determiner 512.

The coordinate transformer 511 transforms the current values iα and iβ in the stationary coordinate system into a current value iq of the q-axis current and a current value id of the d-axis current in the rotating coordinate system by using the following formulae (3) and (4):

$$id = \cos\theta * i\alpha + \sin\theta * i\beta, \quad (3)$$

and $$iq = -\sin\theta * i\alpha + \cos\theta * i\beta. \quad (4)$$

The q-axis current instruction value iq_ref output from the phase controller 502 and the current value iq output from the coordinate transformer 511 are input to a subtractor 102. The subtractor 102 calculates a deviation between the q-axis current instruction value iq_ref and the current value iq, and outputs the deviation to the current controller 503.

The d-axis current instruction value iq_ref output from the phase controller 502 and the current value id output from the coordinate transformer 511 are input to a subtractor 103. The subtractor 103 calculates a deviation between the d-axis current instruction value id_ref and the current value id, and outputs the deviation to the current controller 503.

The current controller 503 generates a driving voltage Vq based on PID control so that the deviation output from the subtractor 102 decreases. Specifically, the current controller 503 generates the driving voltage Vq such that the deviation output from the subtractor 102 becomes zero, and outputs the driving voltage Vq to the inverse coordinate transformer 505.

The current controller 503 also generates a driving voltage Vd based on PID control so that the deviation output from the subtractor 103 decreases. Specifically, the current controller 503 generates the driving voltage Vd such that the deviation output from the subtractor 103 becomes zero, and outputs the driving voltage Vd to the inverse coordinate transformer 505.

While the current controller 503 according to the present exemplary embodiment generates the driving voltages Vq and Vd based on PID control, this is not restrictive. For example, the current controller 503 may generate the driving voltages Vq and Vd based on PI control.

The inverse coordinate transformer 505 inversely transforms the driving voltages Vq and Vd in the rotating coordinate system output from the current controller 503 into driving voltages Vα and Vβ in the stationary coordinate system by using the following formulae (5) and (6):

$$V\alpha = \cos\theta * Vd - \sin\theta * Vq, \quad (5)$$
and
$$V\beta = \sin\theta * Vd + \cos\theta * Vq. \quad (6)$$

The inverse coordinate transformer 505 outputs the inversely transformed driving voltages Vα and Vβ to the induced voltage determiner 512 and the PWM inverter 506.

The PWM inverter 506 includes a full bridge circuit. The full bridge circuit is driven by PWM signals based on the driving voltages Vα and Vβ input from the inverse coordinate transformer 505. As a result, the PWM inverter 506 generates the driving currents iα and iβ based on the driving voltages Vα and Vβ, and drives the stepper motor 402 by supplying the driving currents iα and iβ to the windings of the respective phases of the stepper motor 402. In other words, the PWM inverter 506 functions as a supply unit for supplying currents to the windings of the respective phases of the stepper motor 402. While in the present exemplary embodiment the PWM inverter 506 includes a full bridge circuit, the PWM inverter 506 may include a half bridge circuit.

A configuration for determining the rotation phase θ will now be described. The rotation phase θ of the rotor is determined by using the values of induced voltages Eα and Eβ that are induced in the windings of phases A and B of the stepper motor 402 by the rotation of the rotor. The values of the induced voltages Eα and Eβ are determined (calculated) by the induced voltage determiner 512. Specifically, the induced voltages Eα and Eβ are determined from the current values iα and iβ input from the A/D converter 510 to the induced voltage determiner 512 and the driving voltages Vα and Vβ input from the inverse coordinate transformer 505 to the induced voltage determiner 512 by the following formulae (7) and (8):

$$E\alpha = V\alpha - R*i\alpha - L*di\alpha/dt, \quad (7)$$
and
$$E\beta = V\beta - R*i\beta - L*di\beta/dt. \quad (8)$$

Here, R is the winding resistance, and L is the winding inductance. The values of the winding resistance R and the winding inductance L are values inherent to the stepper motor 402 in use, and stored in the ROM 151*b* or a memory (not illustrated) provided in the motor control device 157 in advance.

The induced voltages Eα and Eβ determined by the induced voltage determiner 512 are output to a phase determiner 513.

The phase determiner 513 determines the rotation phase θ of the rotor of the stepper motor 402 based on a ratio of the induced voltages Eα and Eβ output from the induced voltage determiner 512 by using the following formula (9):

$$\theta = \tan^{-1}(-E\beta/E\alpha). \quad (9)$$

In the present exemplary embodiment, the phase determiner 513 determines the rotation phase θ by performing the calculation based on formula (9). However, this is not restrictive. For example, the phase determiner 513 may determine the rotation phase θ by referring to a table indicating a relationship between the induced voltages Eα and Eβ and the rotation phase θ corresponding to the induced voltages Eα and Eβ, stored in a memory 513*a*.

The rotation phase θ of the rotor obtained as described above is input to the subtractor 101, the inverse coordinate transformer 505, and the coordinate transformer 511.

The motor control device 157 repeats the foregoing control while performing the vector control.

As described above, the motor control device 157 according to the present exemplary embodiment performs the vector control using phase feedback control of controlling the current values in the rotating coordinate system so that the deviation between the instruction phase θ_ref and the rotation phase θ decreases. Performing the vector control can prevent the motor 402 from entering a step-out state, and an increase in motor noise and an increase in power consumption due to surplus torque.

{Constant Current Control}

A method for controlling the stepper motor 402 by the constant current control will now be described.

In the constant current control, the driving currents flowing through the windings of a motor are controlled by supplying predetermined currents to the windings. Specifically, in the constant current control, driving currents having a magnitude (amplitude) corresponding to torque determined by adding a predetermined margin to expected torque for rotating the rotor are supplied to the windings so that the motor does not step out even if the load torque acting on the rotor changes. The reason is that the constant current control does not use a configuration (not involve feedback control) for controlling the magnitudes of the driving currents based on a rotation phase or rotation speed determined (estimated), and is thus unable to adjust the driving currents based on the load torque acting on the rotor. The greater the magnitudes of the driving currents, the higher the torque applied to the rotor. The amplitude corresponds to the magnitude of the current vector.

In the following description, the motor is controlled by supplying the windings with currents having a predetermined magnitude, during the constant current control. However, this is not restrictive. For example, the motor may be controlled by supplying the windings with currents having respective predetermined magnitudes for motor acceleration and deceleration, during constant current control.

In FIG. 5, the instruction generator 500 outputs the instruction phase θ_ref to a constant current controller 517 based on the driving pulses output from the pulse generator 501. The constant current controller 517 generates and outputs current instruction values iα_ref and iβ_ref in the stationary coordinate system that correspond to the instruction phase θ_ref output from the instruction generator 500. In the present exemplary embodiment, the current vector corresponding to the current instruction values iα_ref and iβ_ref in the stationary coordinate system has a constant magnitude.

The driving currents flowing through the windings of phases A and B of the stepper motor 402 are detected by the current detectors 507 and 508. As described above, the detected driving currents that are analog values are converted into digital values by the A/D converter 510.

The current value iα output from the A/D converter 510 and the current instruction value iα_ref output from the constant current controller 517 are input to the subtractor 102. The subtractor 102 calculates a deviation between the current instruction value iα_ref and the current value iα, and outputs the deviation to the current controller 503.

The current value iβ output from the A/D converter 510 and the current instruction value iβ_ref output from the constant current controller 517 are input to the subtractor 103. The subtractor 103 calculates a deviation between the current instruction value iβ_ref and the current value iβ, and outputs the deviation to the current controller 503.

The current controller 503 outputs the driving voltages Vα and Vβ based on PID control so that the input deviation decreases. Specifically, the current controller 503 outputs the driving voltages Vα and Vβ so that the input deviation approaches zero.

The PWM inverter 506 drives the stepper motor 402 by supplying the driving currents to the windings of the respective phases of the stepper motor 402 based on the input driving voltages Vα and Vβ using the foregoing method.

As described above, neither phase feedback control nor speed feedback control is performed in the constant current control according to the present exemplary embodiment. In other words, the driving currents supplied to the windings are not adjusted based on the rotation status of the rotor in the constant current control according to the present exemplary embodiment. In the constant current control, currents determined by adding a predetermined margin to the currents for rotating the rotor are supplied to the windings so that the motor does not step out.

{Instruction Generator}

Figure 6:
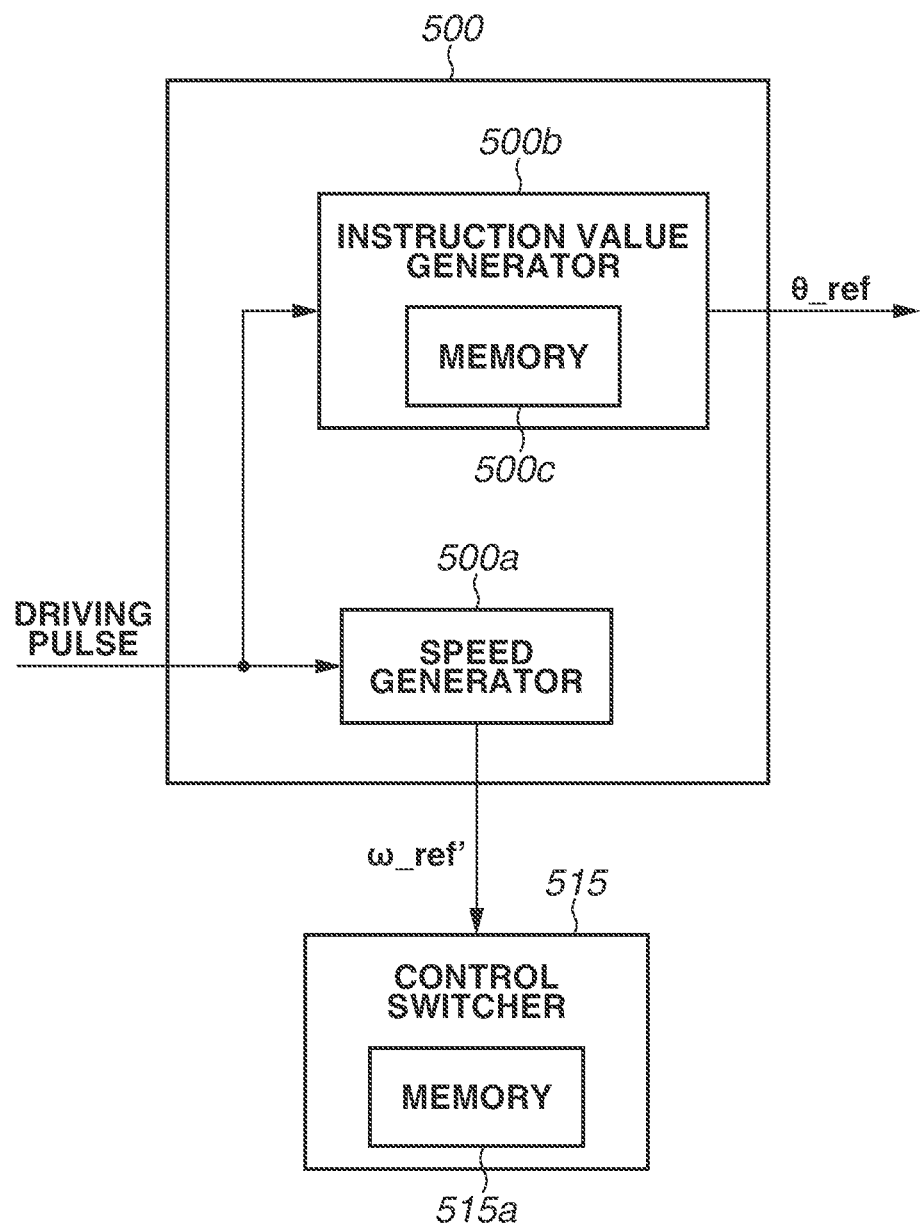
FIG. 6 is a block diagram illustrating a configuration of an instruction generator.

FIG. 6 is a block diagram illustrating a configuration of the instruction generator 500 according to the present exemplary embodiment. As illustrated in FIG. 6, the instruction generator 500 includes a speed generator 500a and an instruction value generator 500b. The speed generator 500a generates a rotation speed ω_ref indicating the target speed of the rotor of the stepper motor 402. The instruction value generator 500b generates the instruction phase θ_ref based on the driving pulses output from the pulse generator 501.

The speed generator 500a generates the rotation speed ω_ref based on time intervals between the rising edges of the consecutive driving pulses, and outputs the rotation speed ω_ref. In other words, the rotation speed ω_ref changes with a period corresponding to that of the driving pulses.

The command value generator 500b generates the instruction phase θ_ref based on the driving pulses output from the pulse generator 501 as expressed by the following formula (10):

$$\theta\_ref = \theta ini + \theta step * n, \qquad (10)$$

and outputs the instruction phase θ_ref.

θini is the phase (initial phase) of the rotor when the stepper motor 402 starts to be driven.

θstep is the amount of increase (amount of change) of θ_ref per driving pulse. N is the number of pulses input to the instruction value generator 500b.

{Micro step Driving}

In the present exemplary embodiment, the constant current control uses microstep driving. The driving method used in the constant current control is not limited to the microstep driving. For example, such a driving method as full step driving may be used.

Figure 7:
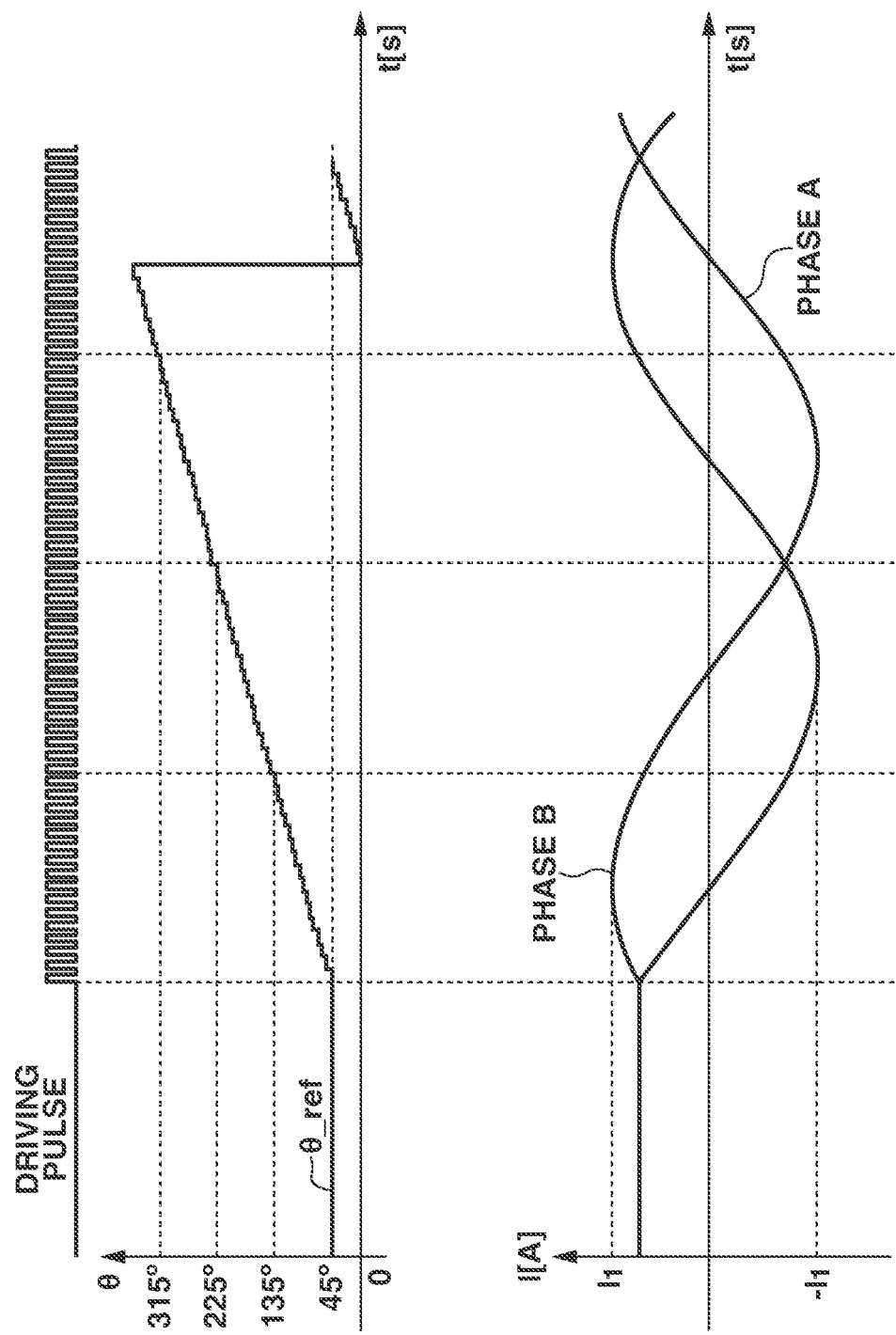
FIG. 7 is a diagram illustrating an example of a method for performing microstep driving.

FIG. 7 is a diagram illustrating an example of a method for performing the microstep driving. FIG. 7 illustrates the driving pulses output from the pulse generator 501, the instruction phase θ_ref generated by the instruction value generator 500b, and the currents flowing through the windings of phases A and B.

The method for performing the microstep driving according to the present exemplary embodiment will be described below with reference to FIGS. 6 and 7. The driving pulses and the instruction phase θ_ref illustrated in FIG. 7 represent a state where the rotor rotates at a constant speed.

The leading amount of the instruction phase θ_ref in the microstep driving is given by dividing the leading amount of the instruction phase θ_ref in the full step driving, 90°, by N (N is a positive integer), i.e., 90°/N. As illustrated in FIG. 7, the current waveforms thus change smoothly in a sinusoidal pattern, whereby the rotation phase θ of the rotor can be more finely controlled.

In performing the microstep driving, the instruction value generator 500b generates the instruction phase θ_ref based on the driving pulses output from the pulse generator 501 as expressed by the following formula (11):

$$\theta\_ref = 45° + 90°/N * n, \qquad (11)$$

and outputs the instruction phase θ_ref.

In such a manner, when one driving pulse is input, the instruction value generator 500b updates the instruction phase θ_ref by adding 90°/N to the instruction phase θ_ref. In other words, the number of driving pulses output from the pulse generator 501 corresponds to the instruction phase θ_ref. The period (frequency) of the driving pulses output from the pulse generator 501 corresponds to the target speed (instruction speed) of the stepper motor 402.

{Switching Between Vector Control and Constant Current Control}

A method for switching from the constant current control to the vector control will now be described. As illustrated in FIG. 5, the motor control device 157 according to the present exemplary embodiment includes a configuration for switching between the constant current control and the vector control in controlling the stepper motor 402. Specifically, the motor control device 157 includes a control switcher 515 and changeover switches 516a, 516b, and 516c. During a period when the constant current control is performed, one or more circuits for performing the vector control may be running or at rest. During a period when the vector control is performed, one or more circuits for performing the constant current control may be running or at rest.

As illustrated in FIG. 5, the rotation speed ω_ref' output from the speed generator 500a is input to the control switcher 515. The control switcher 515 compares the rotation speed ω_ref' with a threshold ωth that is a predetermined value, and switches the motor control method from the constant current control to the vector control based on the comparison result.

Figure 8:
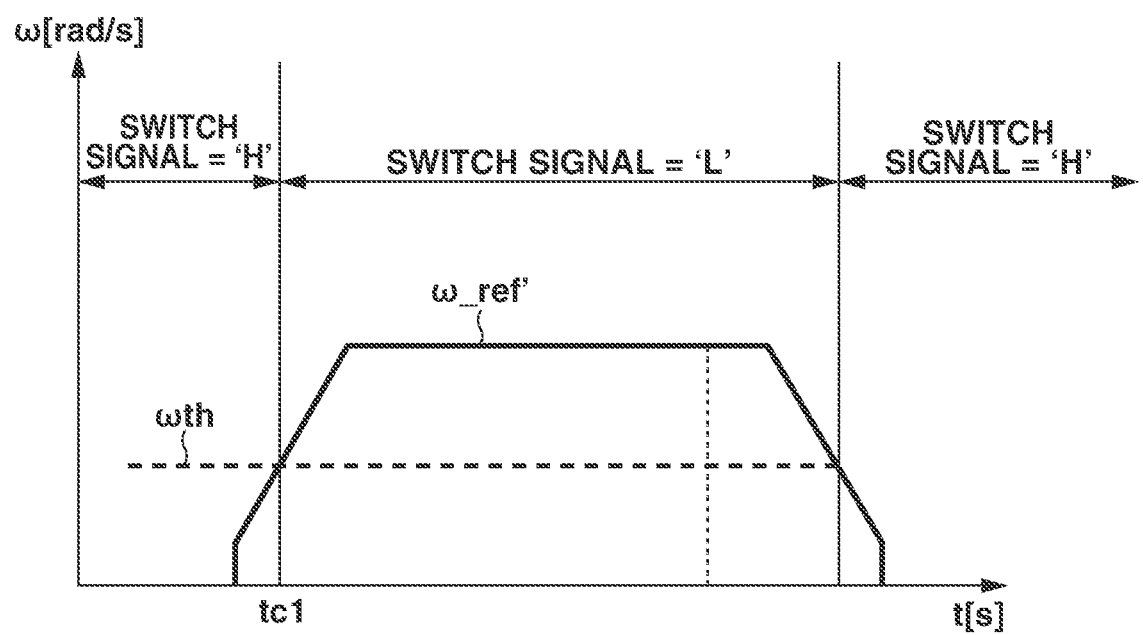
FIG. 8 is a diagram for describing switching of motor control methods.

FIG. 8 is a diagram for describing the switching of the control methods. The threshold ωth according to the present exemplary embodiment is set to a minimum rotation speed among rotation speeds at which the rotation phase θ is precisely determined. However, this is not restrictive. For example, the threshold ωth may be set to a value greater than or equal to the minimum rotation speed among the rotation speeds at which the rotation phase θ is precisely determined. The threshold ωth is stored in a memory 515a in the control switcher 515 in advance, for example.

The control switcher 515 sets a switch signal to 'H' in a case where the constant current control is performed, and sets the switch signal to 'L' in a case where the vector control is performed. As illustrated in FIG. 5, the switch signal output from the control switcher 515 is input to the changeover switches 516a, 516b, and 516c. The control switcher 515 outputs the switch signal at the same period as that at which the rotation speed ω_ref is input, for example.

During the constant current control, if the rotation speed ω_ref' is less than the threshold ωth (ω_ref'<ωth), the control switcher 515 does not switch the control mode in which the stepper motor 402 is controlled. More specifically, the control switcher 515 outputs the switch signal 'H' to maintain the state where the stepper motor 402 is controlled by the constant current control. As a result, the states of the changeover switches 516a, 516b, and 516c are maintained to continue the constant current control.

During the constant current control, if the rotation speed ω_ref' becomes greater than or equal to the threshold ωth (ωref'≥ωth), the control switcher 515 switches the control mode in which the stepper motor 402 is controlled. More specifically, the control switcher 515 switches the switch signal from 'H' to 'L' and outputs the switch signal 'L' to control the stepper motor 402 by using the vector control. As a result, the states of the changeover switches 516a, 516b, and 516c are switched based on the switch signal, and the vector control is performed.

During the vector control, if the rotation speed ω_ref' is greater than or equal to the threshold ωth (ω_ref'≥ωth), the control switcher 515 does not switch the control mode in which the stepper motor 402 is controlled. More specifically, the control switcher 515 outputs the switch signal 'L' to maintain the state where the stepper motor 402 is controlled by the vector control. As a result, the states of the changeover switches 516a, 516b, and 516c are maintained to continue the vector control.

During the vector control, if the rotation speed ω_ref' becomes less than the threshold ωth (ω_ref'<ωth), the control switcher 515 switches the control mode in which the stepper motor 402 is controlled. More specifically, the control switcher 515 switches the switch signal from 'L' to 'H' and outputs the switch signal 'H' to control the stepper motor 402 by using the constant current control. As a result, the states of the changeover switches 516a, 516b, and 516c are switched based on the switch signal, and the constant current control is performed.

A method where the motor control device 157 controls the stepper motor 403 will now be described.

In the present exemplary embodiment, the stepper motor 403 is controlled by the constant current control that is the first control mode.

If the CPU 151a outputs an instruction to start driving the stepper motor 403 to the motor control device 157, a pulse generator 810 outputs driving pulses to an instruction generator 811 as a motor-driving instruction based on an operation sequence of the stepper motor 403. The operation sequence of the stepper motor 403 (driving pattern of the stepper motor 403) is stored in a memory included in the pulse generator 810, for example. The pulse generator 810 outputs the driving pulses as a pulse train based on the operation sequence.

Similarly to the instruction generator 500, the instruction generator 811 generates an instruction phase θ_ref indicating the target phase of the rotor of the stepper motor 403 based on the driving pulses output from the pulse generator 810, and outputs the instruction phase θ_ref.

A constant current controller 801 generates and outputs current instruction values iα_ref and iβ_ref in the stationary coordinate system that correspond to the instruction phase θ_ref output from the instruction generator 811.

The driving currents flowing through the windings of phases A and B of the stepper motor 403 are detected by current detectors 806 and 807. The detected driving currents that are analog values are converted into digital values by an A/D converter 809. The digital values are expressed as current values iα and iβ like formulae (1) and (2).

The current value iα output from the A/D converter 809 and the current instruction value iα_ref output from the constant current controller 801 are input to a subtractor 802. The subtractor 802 calculates a deviation between the current instruction value iα_ref and the current value iα, and outputs the deviation to a current controller 804.

The current value iβ output from the A/D converter 809 and the current instruction value iβ_ref output from the constant current controller 801 are input to a subtractor 803. The subtractor 803 calculates a deviation between the current instruction value iβ_ref and the current value iβ, and outputs the deviation to the current controller 804.

The current controller 804 outputs driving voltages Vα and Vβ based on PID control such that the input deviation decreases. Specifically, the current controller 804 outputs the driving voltages Vα and Vβ such that the input deviation approaches zero.

A PWM inverter 805 drives the stepper motor 403 by supplying driving currents to the windings of the respective phases of the stepper motor 403 based on the input driving voltages Vα and Vβ, using the method described above.

[Application Example of Vector Control and Constant Current Control]

An application example of the vector control and the constant current control according to the present exemplary embodiment will now be described.

In the present exemplary embodiment, the stepper motor 402 drives a conveyance roller (e.g., a conveyance roller such as the registration roller 20) included in the image printing apparatus 301. More specifically, in the present exemplary embodiment, motors (e.g., the stepper motor 402) that drive conveyance rollers for conveying a recording medium start to be driven by the constant current control, and then the control mode is switched from the constant current control to the vector control. In other words, in the present exemplary embodiment, the recording medium is conveyed by conveyance rollers that are driven by the motors controlled by the vector control. This reduces the power consumption of the image forming apparatus 100 compared to the case where the recording medium is conveyed by conveyance rollers that are driven by motors controlled by the constant current control without the vector control. Moreover, noise produced because the motors are controlled by the constant current control can be reduced. Note that the stepper motor 402 is stopped after the control mode is switched from the vector control to the constant current control. In the present exemplary embodiment, stepper motors are used as the motors for driving the conveyance rollers. However, brushless direct-current (DC) motors may be used.

By contrast, in the contact and separation configuration illustrated in FIG. 2, the amount of rotation of the cam 34 is desirably controlled with high precision. Specifically, the stop position of the cam 34 is desirably controlled with high precision. In other words, the phase at which the rotor of the stepper motor 403 stops is desirably controlled with high precision. In the present exemplary embodiment, the stepper motor 403 is therefore controlled by the constant current control during the period from a start to a stop. This precisely controls the amount of rotation of the cam 34. As a result, an image is appropriately formed on the recording medium.

Such a configuration can reduce an increase in the power consumption of the image forming apparatus 100 and prevent a failure of appropriate formation of an image on the recording medium.

In the present exemplary embodiment, the stepper motor 403 drives the cam 34 for contacting and separating the transfer rollers 25Y, 25M, and 25C and the photosensitive drums 22Y, 22M, and 22C. However, this is not restrictive. For example, the stepper motor 403 may be configured to drive a cam for contacting and separating a pair of rollers included in the fixing device 29. Such a configuration can prevent a failure of appropriate formation of an image on the recording medium.

For example, the stepper motor 403 may be configured to drive a cam for contacting and separating the preregistration roller 37 and the roller that forms a nip portion with the preregistration roller 37. Such a configuration can precisely adjust the distance between the rotation shaft of the preregistration roller 37 and the rotation shaft of the roller that forms the nip portion with the preregistration roller 37. In other words, such a configuration can appropriately adjust the nip pressure of the conveyance rollers for conveying the recording medium. As a result, the recording medium can be appropriately conveyed without a damage to the recording medium, and an image can be appropriately formed on the recording medium.

As described above, the stepper motor 403 can be configured to drive an adjustment member for adjusting a distance between the rotation shaft of a first rotating member and the rotation shaft of a second rotating member that forms a nip portion with the first rotating member. With such a configuration, the distance between the rotation shafts of the first and second rotating members can be precisely adjusted. As a result, an image is appropriately formed on the recording medium.

Moreover, for example, a motor that drives the first rotating member may be configured to be driven by the vector control while a motor that drives the adjustment member for adjusting the distance between the rotation shaft of the first rotating member and the rotation shaft of the second rotating member that forms a nip portion with the first rotating member is driven by the constant current control. In the present embodiment, the stepper motor 402 that is driven by the vector control is stopped after the control method is changed to an open control, which is not limited thereto. For example, the stepper motor 402 may be stopped by interrupting the voltage supplied from the power source for the full bridge circuit included in the PWM inverter 506, in a state where the stepper motor 402 is controlled by the vector control. The stepper motor 402 may also be stopped by stopping the control of the stepper motor 402 due to the interruption of the power supplied to the motor control device 157, in the state where the stepper motor 402 is controlled by the vector control. In other words, the stepper motor 402 may also be stopped while the stepper motor 402 is controlled by the vector control.

In the present exemplary embodiment, the stepper motors 402 and 403 are controlled by the motor control device 157 that is a single control integrated circuit (IC). However, this is not restrictive. For example, the stepper motors 402 and 403 may be controlled by respective different control ICs. In such a case, the control IC that controls the stepper motor 402 and the control IC that controls the stepper motor 403 are included in a control unit.

Figure 9:
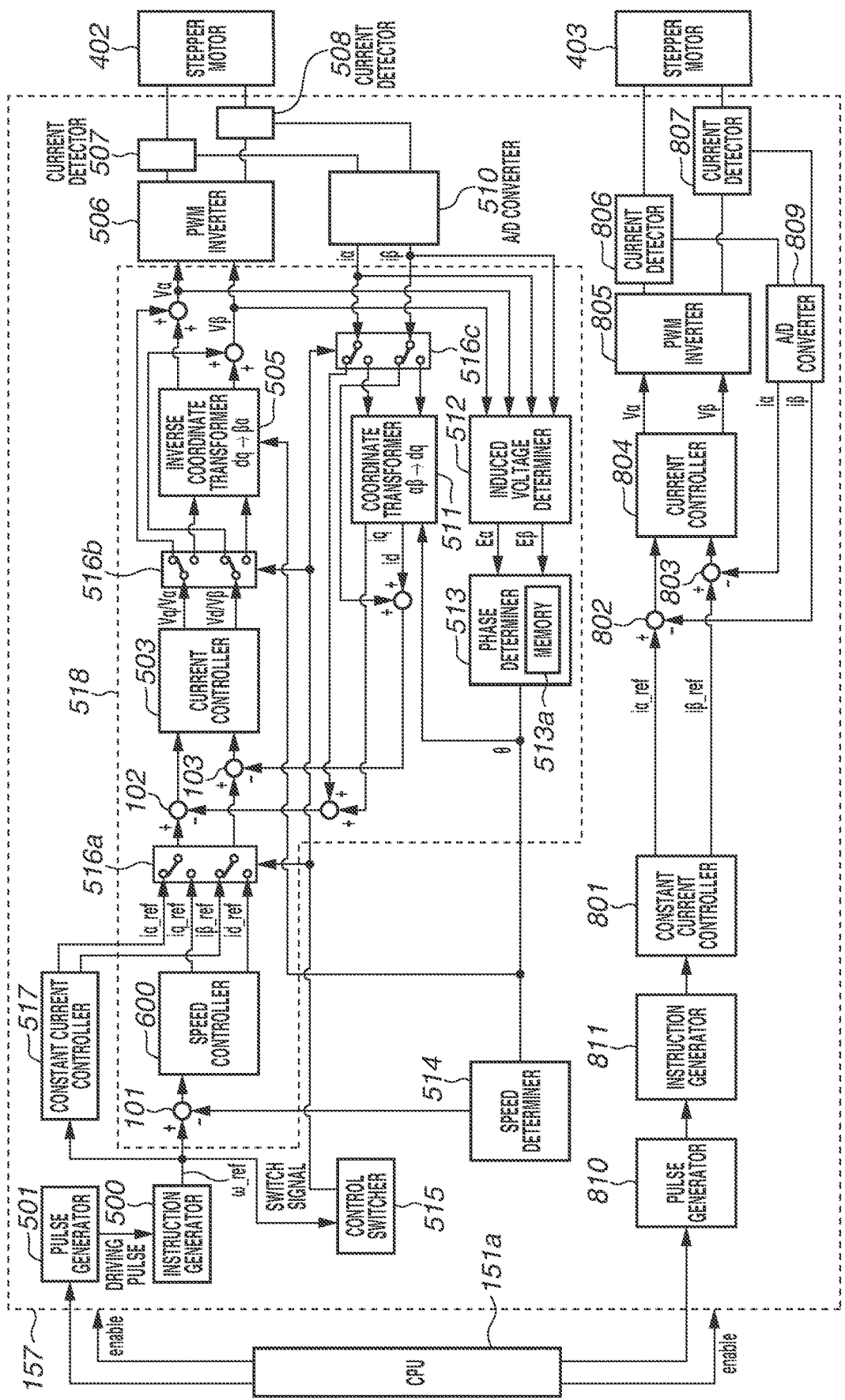
FIG. 9 is a block diagram illustrating a configuration of a motor control device that performs speed feedback control.
Figure 10:
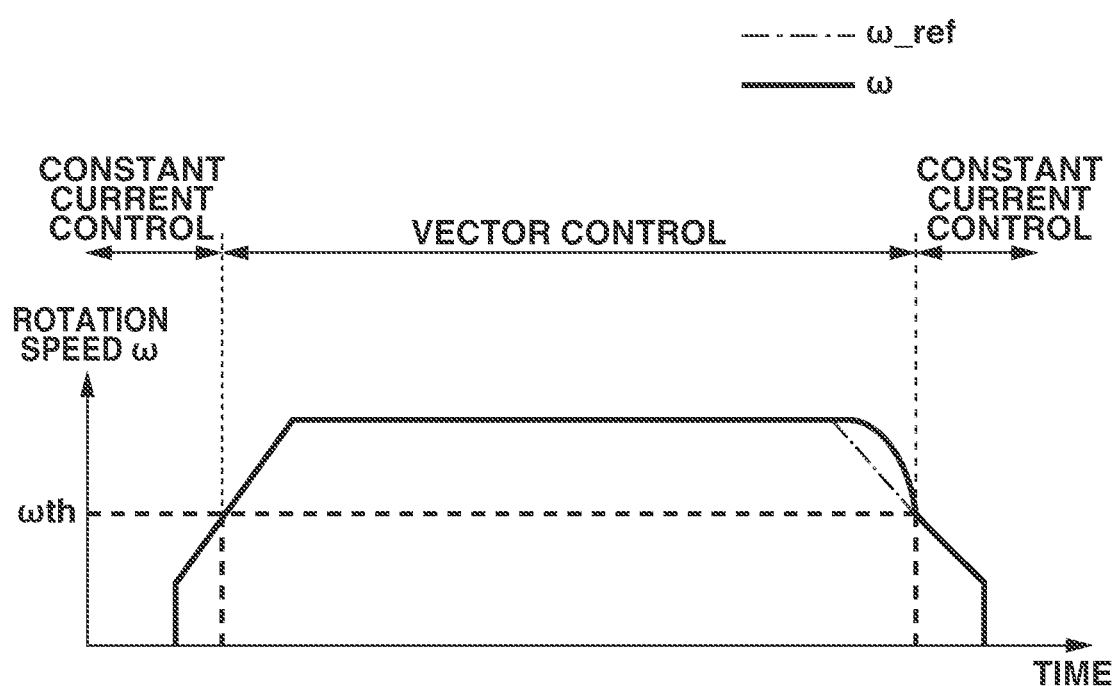
FIG. 10 is a diagram illustrating a relationship between an instruction speed $\omega\_ref$ and an actual rotation speed $\omega$ by conventional motor control.

The vector control according to the present exemplary embodiment controls the stepper motor 402 by using phase feedback control. However, this is not restrictive. For example, the motor control device 157 may be configured to control the stepper motor 402 by feeding back a rotation speed ω of the rotor of the stepper motor 402. Specifically, as illustrated in FIG. 9, the instruction generator 500 outputs an instruction speed ω_ref that indicates the target speed of the rotor. A speed determiner 514 included in the motor control device 157 determines the rotation speed ω based on a temporal change in the rotation phase θ output from the phase determiner 513. The rotation speed ω is determined by using the following formula (12):

$$\omega = d\theta/dt. \qquad (12)$$

A speed controller 600 is configured to generate the q-axis current instruction value iq_ref such that a deviation between the rotation speed ω and the instruction speed ω_ref decreases, and output the q-axis current instruction value iq_ref. The motor control device 157 may thus be configured to perform such a speed feedback control. Since in this configuration the rotation speed ω of the rotor is fed back, the rotation speed ω can be controlled to be a predetermined speed. The foregoing method for determining the rotation speed ω is an example, and any conventional methods may be used.

In the present exemplary embodiment, the constant current control and the vector control are switched based on the comparison between the rotation speed ω_ref serving as a value corresponding to the rotation speed of the rotor of the stepper motor 402 and the threshold ωth. However, this is not restrictive. For example, the constant current control and the vector control may be switched based on a comparison between the threshold ωth and the rotation speed ω determined by the speed determiner 514 illustrated in FIG. 9 as a value corresponding to the rotation speed of the rotor of the stepper motor 402.

According to the present exemplary embodiment, an increase in the power consumption of the image forming apparatus can be reduced while preventing a failure of appropriate formation of an image on the recording medium.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-198746, filed Nov. 30, 2020, which is hereby incorporated by reference herein in its entirety.

What is claimed is:

1. An image forming apparatus comprising:
a photosensitive member;
an intermediate transfer member to which a toner image formed on the photosensitive member is to be transferred;
a conveyance roller configured to convey a recording medium;
a transfer unit configured to transfer the toner image transferred to the intermediate transfer member to the recording medium conveyed by the conveyance roller;
a moving member configured to move between a first position where the photosensitive member is in contact with the intermediate transfer member and a second position where the photosensitive member is separated from the intermediate transfer member;
a driving motor configured to drive the conveyance roller;
a stepper motor configured to drive the moving member;
a detector configured to detect a driving current flowing through a winding of the driving motor; and
a controller including a phase determiner configured to determine a rotation phase of a rotor of the driving motor based on the driving current detected by the detector, and configured to operate in either a first control mode to control a motor based on a current having a predetermined magnitude and a second control mode to control a motor by performing vector control such that a deviation between the rotation phase determined by the phase determiner and an instruction phase indicating a target phase of the rotor of the driving motor decreases,
wherein the vector control is a control method for driving the driving motor based on a torque current component that (i) is a current component expressed in a rotating coordinate system based on the rotation phase determined by the phase determiner, and (ii) is a current component configured to generate torque on the rotor of the driving motor,
wherein the controller is configured to start driving the driving motor in the first control mode, and switch a control mode in which the driving motor is controlled from the first control mode to the second control mode in a case where a value corresponding to a rotation speed of the rotor of the driving motor exceeds a predetermined value during execution of the first control mode, and
wherein the controller is configured to control the stepper motor in the first control mode during a period from when the stepper motor is activated to when the stepper motor is stopped.

2. The image forming apparatus according to claim 1, wherein, in a case where the driving motor controlled in the second control mode is to be stopped, the controller is configured to switch the control mode from the second control mode to the first control mode in a period in which the driving motor is deaccelerated and stop the driving motor in the first control mode.

3. The image forming apparatus according to claim 1, wherein, in a case where the driving motor controlled in the second control mode is to be stopped, the controller is configured to stop the driving motor in the second control mode.

4. An image forming apparatus comprising:
a photosensitive member;
an intermediate transfer member to which a toner image formed on the photosensitive member is to be transferred;
a conveyance roller configured to convey a recording medium;
a transfer unit configured to transfer the toner image transferred to the intermediate transfer member to the recording medium conveyed by the conveyance roller;
a moving member configured to move between a first position where the photosensitive member is in contact with the intermediate transfer member and a second position where the photosensitive member is separated from the intermediate transfer member;
a driving motor configured to drive the conveyance roller;
a stepper motor configured to drive the moving member;
a detector configured to detect a driving current flowing through a winding of the driving motor; and
a controller including a phase determiner configured to determine a rotation phase of a rotor of the driving motor based on the driving current detected by the detector and a speed determiner configured to determine a rotation speed of the rotor of the driving motor, and configured to operate in either a first control mode to control a motor based on a current having a predetermined magnitude and a second control mode to control a motor by performing vector control such that a deviation between the rotation speed determined by the speed determiner and an instruction speed indicating a target speed of the rotor of the driving motor decreases,
wherein the vector control is a control method for driving the driving motor based on a torque current component that (i) is a current component expressed in a rotating coordinate system based on the rotation phase determined by the phase determiner, and (ii) is a current component configured to generate torque on the rotor of the driving motor,
wherein the controller is configured to start driving the driving motor in the first control mode, and switch a control mode in which the driving motor is controlled from the first control mode to the second control mode in a case where a value corresponding to the rotation speed of the rotor of the driving motor exceeds a predetermined value during execution of the first control mode, and
wherein the controller is configured to control the stepper motor in the first control mode during a period from when the stepper motor is activated to when the stepper motor is stopped.

5. An image forming apparatus comprising:
a photosensitive member;
an intermediate transfer member to which a toner image formed on the photosensitive member is to be transferred;
a conveyance roller configured to convey a recording medium;
a transfer unit configured to transfer the toner image transferred to the intermediate transfer member to the recording medium conveyed by the conveyance roller;
a moving member configured to move between a first position where the photosensitive member is in contact with the intermediate transfer member and a second position where the photosensitive member is separated from the intermediate transfer member;
a driving motor configured to drive the conveyance roller;
a stepper motor configured to drive the moving member;
a detector configured to detect a driving current flowing through a winding of the driving motor; and
a controller including a phase determiner configured to determine a rotation phase of a rotor of the driving motor based on the driving current detected by the detector and a voltage determiner configured to determine an induced voltage generated in the winding of the driving motor by rotation of the rotor of the driving motor based on the driving current detected by the detector, and configured to operate in either a first control mode to control a motor based on a current having a predetermined magnitude and a second control mode to control a motor by performing vector control based on the rotation phase determined by the phase determiner,
wherein the phase determiner is configured to determine the rotation phase of the rotor of the driving motor based on the induced voltage determined by the voltage determiner.

6. The image forming apparatus according to claim 1, wherein a value corresponding to the rotation speed of the rotor of the driving motor is a value indicating a target speed of the rotor of the driving motor.

7. The image forming apparatus according to claim 1, wherein the controller is a single control integrated circuit (IC) configured to control a plurality of motors.

8. The image forming apparatus according to claim 1, wherein the stepper motor is a first stepper motor and the driving motor is a second stepper motor.

9. The image forming apparatus according to claim 1, wherein the driving motor is a brushless direct-current (DC) motor.

* * * * *